(12) United States Patent
Nordbruch

(10) Patent No.: US 10,388,163 B2
(45) Date of Patent: Aug. 20, 2019

(54) MOTOR VEHICLE AND PARKING LOT FOR MOTOR VEHICLES AS WELL AS COMMUNICATIONS SYSTEM

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/752,435

(22) PCT Filed: Jul. 5, 2016

(86) PCT No.: PCT/EP2016/065831
§ 371 (c)(1),
(2) Date: Feb. 13, 2018

(87) PCT Pub. No.: WO2017/036637
PCT Pub. Date: Mar. 9, 2017

(65) Prior Publication Data
US 2019/0012916 A1 Jan. 10, 2019

(30) Foreign Application Priority Data
Sep. 3, 2015 (DE) ............ 10 2015 216 900

(51) Int. Cl.
*B60R 25/10* (2013.01)
*G08G 1/14* (2006.01)
(Continued)

(52) U.S. Cl.
CPC ............ *G08G 1/142* (2013.01); *B60W 30/06* (2013.01); *B62D 15/0285* (2013.01); *H04L 1/22* (2013.01);
(Continued)

(58) Field of Classification Search
CPC ........ E04H 6/422; E04H 6/426; G08G 1/142; G08G 1/148; B60W 30/06; B62D 15/0285; G01S 13/91
See application file for complete search history.

(56) References Cited

U.S. PATENT DOCUMENTS 5,557,254 A * 9/1996 Johnson ............... B60R 25/102
340/426.19
7,714,742 B1 5/2010 Noworolski et al.
(Continued)

FOREIGN PATENT DOCUMENTS

DE 102008060231 A1 6/2009
DE 102008061304 A1 7/2009
(Continued)

OTHER PUBLICATIONS

International Search Report dated Oct. 7, 2016, of the corresponding International Application PCT/EP2016/065831 filed Jul. 5, 2016.

*Primary Examiner* — Munear T Akki
(74) *Attorney, Agent, or Firm* — Norton Rose Fulbright US LLP; Gerard Messina

(57) ABSTRACT

A motor vehicle, which includes a redundantly designed communications system which has a first communications device for the communication via a first wireless communications network, a second communications device for the communication via a second wireless communications network, and a control unit for the redundant operation of the first communications device and the second communications device. A parking lot for motor vehicles and a communication system are also described.

17 Claims, 2 Drawing Sheets

(51) Int. Cl.
  *B62D 15/02*   (2006.01)
  *H04L 1/22*    (2006.01)
  *H04L 29/06*   (2006.01)
  *B60W 30/06*   (2006.01)
  *G08G 1/0968*  (2006.01)
  *G01S 13/91*   (2006.01)

(52) U.S. Cl.
  CPC .............. *H04L 69/14* (2013.01); *G01S 13/91* (2013.01); *G08G 1/096811* (2013.01); *G08G 1/146* (2013.01); *G08G 1/148* (2013.01)

(56) References Cited

U.S. PATENT DOCUMENTS

| | | | | |
|---|---|---|---|---|
| 8,620,572 | B2* | 12/2013 | Nielsen | G01S 5/0284 |
| | | | | 701/408 |
| 2008/0105502 | A1* | 5/2008 | Koth | B60T 7/085 |
| | | | | 188/72.6 |
| 2008/0111741 | A1* | 5/2008 | Lee | G01S 19/37 |
| | | | | 342/383 |
| 2011/0182703 | A1* | 7/2011 | Alan | E04H 6/183 |
| | | | | 414/231 |
| 2012/0098717 | A1* | 4/2012 | Petrucci | H01Q 1/3275 |
| | | | | 343/713 |
| 2012/0182935 | A1 | 7/2012 | Addepalli et al. | |
| 2014/0156111 | A1* | 6/2014 | Ehrman | G06Q 30/0645 |
| | | | | 701/2 |
| 2014/0340240 | A1 | 11/2014 | Becker et al. | |
| 2015/0189438 | A1 | 7/2015 | Hampiholi et al. | |
| 2016/0167530 | A1* | 6/2016 | Bolik | B60L 11/182 |
| | | | | 320/108 |
| 2016/0264132 | A1* | 9/2016 | Paul | B60W 30/06 |

FOREIGN PATENT DOCUMENTS

| | | |
|---|---|---|
| DE | 102009015513 A1 | 10/2009 |
| DE | 102010038640 A1 | 2/2012 |
| DE | 102012109620 A1 | 4/2013 |
| DE | 102012218172 A1 | 7/2013 |
| DE | 102012222562 A1 | 6/2014 |
| DE | 102013201168 A1 | 7/2014 |
| DE | 102013005824 A1 | 10/2014 |
| JP | 2002279462 A | 9/2002 |
| JP | 2005086421 A | 3/2005 |
| JP | 2005341213 A | 12/2005 |
| JP | 2009200843 A | 9/2009 |
| JP | 2012126193 A | 7/2012 |

\* cited by examiner

MOTOR VEHICLE AND PARKING LOT FOR MOTOR VEHICLES AS WELL AS COMMUNICATIONS SYSTEM

FIELD

The present invention relates to a motor vehicle, to a parking lot for motor vehicles, and to a communications system.

BACKGROUND INFORMATION

German Patent Application No. DE 10 2012 222 562 A1 describes a system for managed parking areas for transferring a vehicle from a starting position to a destination position. A communication with the vehicle is required during this transfer in order, for instance, to transmit driving commands to the vehicle that the vehicle is to execute.

Fully automated (autonomous), so-called valet parking usually requires a communication with the vehicle. Fully automated valet parking describes an automatic parking operation in which the vehicle parks and unparks automatically without a driver having to drive the vehicle to the corresponding parking position.

In what is generally referred to as fully automated valet parking, a number of possibilities are available for its execution. For example, it is provided that the vehicle is remotely controlled. It is provided, for instance, that the vehicle drives autonomously, or a mixed form of the two aforementioned specific embodiments is provided, for example. In other words, the vehicle is remotely controlled for part of the way and drives autonomously for another part of the way.

To execute fully automated valet parking, i.e., to carry out the automated parking operation, driving commands or a digital map of the parking lot, for example, have to be transmitted to the vehicle, so that the vehicle is able to autonomously navigate within the parking lot on the basis of the digital map.

SUMMARY

An object of the present invention includes providing an for an efficient communication between a motor vehicle and a parking lot.

Advantageous developments and refinements of the present invention are described herein.

According to one aspect, a motor vehicle is provided, which includes:
 a redundantly developed communications system, which has
 a first communications device for the communication via a first wireless communications network,
 a second communications device for the communication via a second wireless communications network, and
 a control unit for the redundant operation of the first communications device and the second communications device.

According to another aspect, a parking lot for motor vehicles is provided, which includes:
 a redundantly developed communications system, which has
 a first communications device for the communication via a first wireless communications network,
 a second communications device for the communication via a second wireless communications network, and
 a control unit for the redundant operation of the first communications device and the second communications device.

According to a further aspect, a communications system is provided, which includes:
 a first communications device for the communication via a first wireless communications network,
 a second communications device for the communication via a second wireless communications network, and
 a control unit for the redundant operation of the first communications device and the second communications device.

According to one specific embodiment, the communications system is the redundantly developed communications system of the motor vehicle and/or the parking lot. Features of the redundantly developed communications system of the motor vehicle or the parking lot apply in an analogous manner to the communications system.

In other words, the present invention, in particular and among other things, includes the idea of providing redundancy in the communication between the motor vehicle and the parking lot insofar as two communications devices are provided, which are able to communicate via a wireless communications network in each case. In the event that one of the two communications devices fails or malfunctions, the other of the two communications devices will then be able to be used, or is used, for the communication. In other words, this results in the particular technical advantage of allowing for an efficient communication between a parking lot and a motor vehicle.

Thus, the present invention, in particular and among other things, encompasses the idea of providing the motor vehicle and/or the parking lot with a redundantly developed communications system. Because of the redundantly developed communications system, a reliable and robust communication is able to be ensured between the motor vehicle and the parking lot. This provides the particular technical advantage that an efficient communication is able to be carried out between the motor vehicle and the parking lot.

When describing the communications system, in particular the redundantly developed communications system, in connection with the parking lot or the motor vehicle in the preceding and in the following text, it should be noted that the corresponding communications systems are also disclosed by themselves in each case, i.e., without the motor vehicle or without the parking lot.

The fact that the communications system is designed as a redundant system in particular means that when the first communications device fails, for example, the second communications device is able to take over the communication, or vice versa. For instance, when a fault is detected in the communications link between the motor vehicle and the parking lot via the first wireless communications network, a switch to the second communications device takes place, so that the communication between the motor vehicle and the parking lot will then be carried out via the second wireless communications network. Thus, if interruptions occur in the first wireless communications network, then the second wireless communications network is still advantageously available in a redundant manner for a communication via said second communications network.

Communicating within the meaning of the present invention in particular includes transmitting and receiving data by way of the corresponding wireless communications network.

Data, for example, include the following data: map data of a digital map, driving-command data of one or more driving command(s) that the vehicle is meant to execute, positional and/or velocity data of additional motor vehicles or persons that are located within the parking lot, setpoint-trajectory data for a setpoint trajectory along which the motor vehicle is to travel inside the parking lot, positional destination data of a destination position that the vehicle is to reach.

As a result, data thus generally include data that are relevant for carrying out an automatic parking operation. In an automatic parking operation, the motor vehicle drives without a driver from a starting position to a parking position and parks at the parking position. In an automatic parking operation, the motor vehicle drives from the parking position to a destination position, where a person is able to pick up the motor vehicle or take over the motor vehicle. In an automatic parking operation, the motor vehicle travels autonomously or is remotely controlled. In an automatic parking operation, it is especially provided that the vehicle is remotely controlled for part of the way and travels autonomously for another part of the way. In other words, the motor vehicle travels in a driverless manner inside the parking lot within the framework of the automatic parking operation. "Driverless" thus includes "autonomously" and/or "remotely controlled".

According to one specific embodiment, a wireless communications network, i.e., the first or the second communications network, is a WLAN communications network and/or a mobile telephony network and/or a LoRa communications network or includes such a network. A LoRa communications network denotes a communications network according to the LoRa standard, 'LoRa' standing for 'low power wide-range communication'.

According to one specific embodiment, a communication via the communications network, i.e., via the first and the second communications network, respectively, will be or is encrypted.

The term 'respectively' in particular includes the wording 'and/or'.

A parking lot within the meaning of the present invention is used as a parking area for motor vehicles. The parking lot thus especially forms a cohesive area that has a plurality of parking spaces (in case of a parking lot on private property) or parking positions (in a parking area on public property). The parking spaces or parking positions are therefore parking areas. According to one specific embodiment, the parking lot is developed as a parking building. The parking lot according to a further specific embodiment is developed as a parking garage. The parking areas may also be referred to as parking positions.

According to one specific embodiment, the motor vehicle is, thus, developed to perform an automatic parking operation. Such a motor vehicle may also be referred to as an AVP motor vehicle. 'AVP' stands for 'automated valet parking' and may be translated as an automated parking operation.

According to one specific embodiment, the first wireless communications network and the second wireless communications network have an identical design. In other words, the first wireless communications network and the second wireless communications network are a WLAN communications network or a mobile telephony network or a LoRa communications network in each case.

According to one specific embodiment, the first wireless communications network and the second wireless communications network are two different communications networks. For example, the first wireless communications network is a WLAN communications network, and the second communications network is a mobile telephony network, or vice versa.

According to one specific embodiment, it is provided that the first communications device and the second communications device are developed as communications devices that are separate from each other.

This provides the particular technical advantage that a simple physical separation between the two communications devices is able to be established. In particular, the redundancy is able to be accomplished in an efficient manner in this way, which minimizes in particular the risk that they may be affected by a shared interruption.

According to another specific embodiment, it is provided that one of the two communications devices is encompassed by a main unit of an infotainment system.

This provides the particular technical advantage that the main unit, which may also be referred to as a head unit, is able to be used in an efficient manner inasmuch as the main unit normally already includes a communications device. In other words, the already provided communications device of the main unit is used in an advantageous and efficient manner. This communications device, for instance, is a mobile radio communications device. As a result, no additional communications device is required.

According to one further specific embodiment, one of the two communications devices is encompassed by a vehicle module for carrying out an automatic parking operation.

This provides the particular technical advantage that such a vehicle module already includes its own communications device, similar to the head unit. The respective advantages correspond to those of the head unit.

According to one specific embodiment, the first communications device and the second communications device are encompassed by a shared communications device.

The spatial combination of the two communications devices so as to form a shared communications device provides the particular technical advantage that an efficient installation of the communications device in the motor vehicle is possible.

In a shared communications device, it is particularly provided that each of the two communications devices has its own electrical interface for a voltage supply. In other words, the two communications devices are able to function independently of each other.

According to one specific embodiment, the first communications device and the second communications device include a plurality of transceiver units, which are spatially distributed within the parking lot in each case.

This is particularly advantageous since it allows for an efficient radio coverage within the parking lot.

A transceiver unit within the meaning of the present invention especially includes one or more receiver(s) and/or one or more transmitter(s) for receiving and transmitting by way of the corresponding communications network.

According to one specific embodiment, it is provided that the individual transceiver units of the first communications device and the second communications device are at least partially developed as communications devices that are separate from one another.

This provides the particular technical advantage that an efficient redundancy is able to be established as a result of the spatial separation. More specifically, this reduces the risk that they may be affected by a shared interruption.

According to another specific embodiment, the respective transceiver units of the first communications device and the second communications device are at least partially developed as a shared communications device in each case.

This provides the particular technical advantage of allowing for an efficient installation or placement of the transceiver units inside the parking lot.

In a shared communications device, it is provided, in particular, that each one of the transceiver units has its own electrical interface for a voltage supply. The respective transceiver units thus function independently of one another.

Below, the present invention is described in greater detail with the aid of preferred exemplary embodiments.

DETAILED DESCRIPTION OF EXAMPLE EMBODIMENTS

Figure 1:
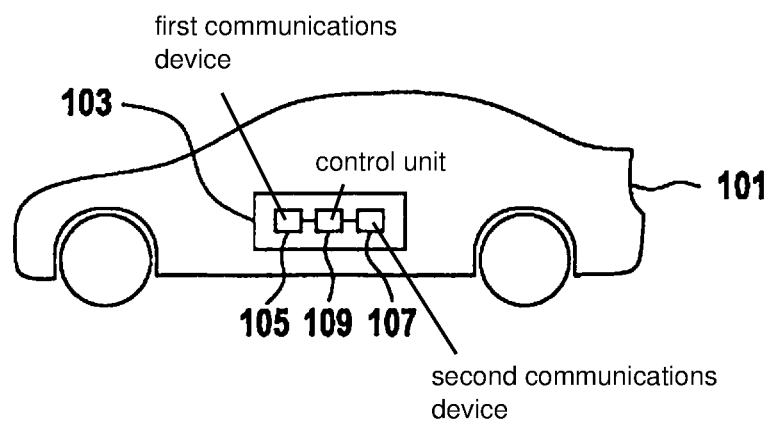
FIG. 1 shows a motor vehicle.

FIG. 1 shows a motor vehicle 101.
Motor vehicle 101 includes:
a redundantly developed communications system 103, which has
a first communications device 105 for the communication via a first wireless communications network,
a second communications device 107 for the communication via a second wireless communications network, and
a control unit 109 for the redundant operation of the first communications device and the second communications device.

Figure 2:
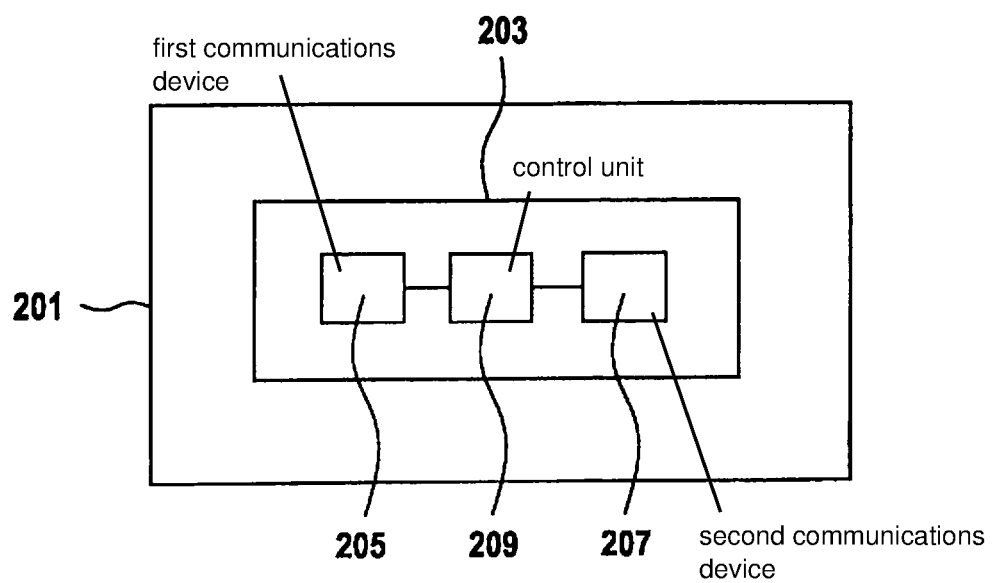
FIG. 2 shows a parking lot for motor vehicles.

FIG. 2 shows a parking lot 201 for motor vehicles.
Parking lot 201 includes:
a redundantly developed communications system 203, which has
a first communications device 205 for the communication via a first wireless communications network,
a second communications device 207 for the communication via a second wireless communications network, and
a control unit 209 for the redundant operation of the first communications device and the second communications device.

In one specific embodiment, the first and/or the second communications network is/are set up within the parking lot.

Figure 3:
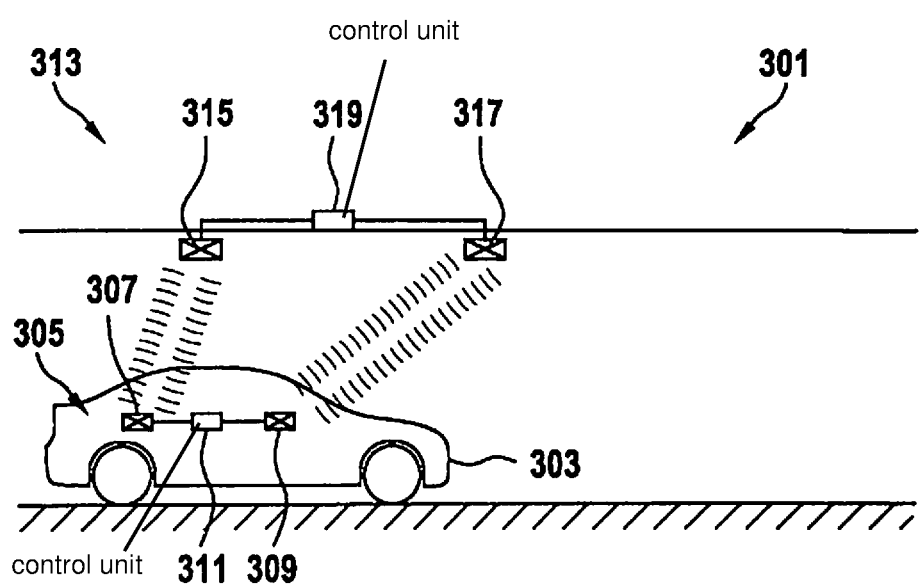
FIG. 3 shows a further parking lot for motor vehicles, where a motor vehicle is located within the parking lot.

FIG. 3 shows a parking lot 301 in which a motor vehicle 303 is driving.

Motor vehicle 303 includes a redundantly developed communications system 305. Redundantly developed communications system 305 of motor vehicle 303 includes a first communications device 307 for the communication via a WLAN communications network. In addition, communications system 305 of motor vehicle 303 includes a second communications device 309 for the communication via a mobile communications network.

Communications system 305 of motor vehicle 303 also includes a control unit 311 for the redundant operation of first communications device 307 and second communications device 309.

Parking lot 301 includes a redundantly developed communications system 313. Redundantly developed communications system 313 of parking lot 301 has a first communications device 315 for the communication via the WLAN communications network. Furthermore, redundantly developed communications system 313 of parking lot 301 has a second communications device 317 for the communication via the mobile radio communications network.

In other words, motor vehicle 303 and parking lot 301 are able to communicate with each other both via WLAN and via mobile telephony. For example, first communications device 307 of motor vehicle 303 communicates via WLAN with first communications device 315 of the parking lot. Second communications device 309 of vehicle 303 communicates via mobile telephony with second communications device 317 of parking lot 301.

Thus, two communications channels are created, which thus ensure redundancy. For example, it is provided that one of the two communications channels is a main communications channel. The other communications channel, for instance, is used only if the main communications channel malfunctions or experiences interference. A malfunction or interference, for example, may be caused by a failure or a malfunction of one of the corresponding communications devices.

In such a case, the corresponding control unit then switches the communication from the main communications channel to the other communications channel.

According to a general specific embodiment, it is therefore provided that in the event of a fault, the control unit (of the motor vehicle or of the parking lot) is developed to switch a communication that is carried out with the aid of one of the two communications devices to the other one of the two communications devices, so that the communication is able to be continued with the aid of the other of the two communications devices.

A fault case includes, for example: a failure and/or an interruption in the communication, which may be the result of a failure or a malfunction in one of the corresponding communications devices, for instance.

Therefore, the present invention in particular provides an efficient technical solution that is able to resolve or eliminate a problem in a communication within the scope of an automatic parking operation. According to the present invention, in particular, a redundant communications type is used in the event of a fault. In other words, for instance, there exists a main communications type, such as Wifi/WLAN, and there is a second communications type, which is used in the event that a fault has occurred in the first communications type. In this instance, for example, a communication via mobile telephony takes place in the event of a fault in the WLAN communication.

According to one specific embodiment, the types of communication, i.e., the communications networks, differ. For example, one of the wireless communications networks is a Wifi/WLAN network while the other communications network is a mobile radio communications network. In another specific embodiment, the two communications types, i.e. the two wireless communications networks, are identical.

According to one specific embodiment, at least two different transmitters and at least two different receivers are provided in the respective communications device for the purpose of redundancy. In other words, the communications device (the first and the second, respectively) has at least two transmitters and at least two receivers in each case, thereby also providing redundancy in this way.

Preferably, the communication types are also redundant in the hardware and/or the software, which means, for example, that two different communications modules exist in the vehicle (separate communications devices) and in the infrastructure, i.e., within the parking lot. In other words, in one further specific embodiment the communications types in the hardware and software are separate on both sides (motor vehicle and parking lot).

In one specific embodiment, it is provided that the two communications devices are encompassed by a shared communications device. In this case, according to one specific embodiment, the shared communications device is developed in such a way that in the event of a fault (such as no current and/or no reception) in one of the communications devices, the other communications device is able to continue to function, or functions.

According to one specific embodiment, the communications devices are integrated into systems or devices already installed in the motor vehicle. For example, one of the communications devices may be integrated into the main unit (also referred to as the head unit). The other communications device is then integrated into the vehicle module for the execution of an automatic parking operation, for instance. Such a vehicle module may also be referred to as an 'AVP function module'.

The advantage according to the present invention is to be seen in a robust and stable communication between the parking lot and the motor vehicle, in particular.

According to one specific embodiment, the parking lot includes a parking-lot administration server, which is designed to control and/or coordinate an automatic parking operation. The data required for this purpose are made available to the motor vehicle via the redundantly developed communications system.

What is claimed is:

1. A motor vehicle, comprising:
 a redundantly developed communication system situated in the motor vehicle, the communication system including a first communication device for the communication via a first wireless communication network, a second communication device for the communication via a second wireless communication network, and a control unit for redundant operation of the first communication device and the second communication device so that two communication channels are created, a first one of the two communication channels being via the first communication device, and the other of the two communication channels being via the second communication device, the motor vehicle communicating, via the first communication device, with a communication system of a parking lot via the first one of the two communication channels, and the motor vehicle switching, via the control unit, to communicating, via the second communication device, with the communication system of the parking lot via the other one of the two communication channels only when the first one of the two communication channels malfunctions or experiences interference;
 wherein data, communicated between the motor vehicle and the communication system of the parking lot using the first communication channel of the two communication channels via the first communication device and using the other one of the communication channels via the second communication device, include data for carrying out, by the motor vehicle, an automatic parking operation.

2. The motor vehicle as recited in claim 1, wherein the first communication device and the second communication device are developed as communication devices that are separate from each other.

3. The motor vehicle as recited in claim 2, wherein one of the two communication devices is encompassed by a main unit of an infotainment system.

4. The motor vehicle as recited in claim 2, wherein one of the two communication devices is encompassed by a vehicle module for carrying out the automatic parking operation.

5. The motor vehicle as recited in claim 1, wherein the first communication device and the second communication device are encompassed by a shared communications device.

6. The motor vehicle as recited in claim 1, wherein the first wireless communication network is a first one of a WLAN communication network, a mobile telephony communication network, or a LoRa communication network, and the second wireless communication network is a second one of the WLAN communication network, the mobile telephony communication network, or the LoRa communication network, the first one being different than the second one.

7. The motor vehicle as recited in claim 1, wherein the data for carrying out the automatic parking operation include driving-command data of one or more driving commands that the motor vehicle is to execute.

8. The motor vehicle as recited in claim 1, wherein the data for carrying out the automatic parking operation include setpoint-trajectory data for a setpoint trajectory along which the motor vehicle is to travel inside the parking lot.

9. The motor vehicle as recited in claim 1, wherein the data for carrying out the automatic parking operation include map data of a digital map.

10. A parking lot for motor vehicles, comprising: a redundantly developed communication system situated in the parking lot, the communication system including a first communication device for the communication via a first wireless communication network, a second communication device for the communication via a second wireless communication network, and a control unit for redundant operation of the first communication device and the second communication device so that two communication channels are created, a first one of the two communication channels being via the first communication device, and the other of the two communication channels being via the second communication device, a server of the parking lot communicating, via the first communication device, with a communication system of a motor vehicle via the first one of the two communication channels, and the server switching, via the control unit, to communicating, via the second communication device, with the communication system of the motor vehicle via the other one of the two communication channels only when the first one of the two communication channels malfunctions or experiences interference; wherein data, communicated between the motor vehicle and the server of the parking lot using the first one of the communication channels of the two communication channels via the first communication device and using the other one of the communication channels via the second communication device, include data for carrying out, by the motor vehicle, an automatic parking operation, the server configured to control or coordinate the automatic parking operation in the parking lot.

11. The parking lot as recited in claim 10, wherein the first communication device and the second communication device include a plurality of transceiver units, which are spatially distributed within the parking lot.

12. The parking lot as recited in claim 10, wherein a respective transceiver unit of the first communication device and a respective transceiver unit of the second communication device are at least partially developed as communication devices that are separate from each other.

13. The parking lot as recited in claim 10, wherein a respective transceiver unit of the first communication device and a respective transceiver unit of the second communication device are at least partially developed as a shared communication device.

14. The parking lot as recited in claim 10, wherein the first wireless communication network is a first one of a WLAN communication network, a mobile telephony communication network, or a LoRa communication network, and the second wireless communication network is a second one of the WLAN communication network, the mobile telephony communication network, or the LoRa communication network, the first one being different than the second one.

15. The parking lot as recited in claim 10, wherein the data for carrying out the automatic parking operation include driving-command data of one or more driving commands that the motor vehicle is to execute.

16. The parking lot as recited in claim 10, wherein the data for carrying out the automatic parking operation include setpoint-trajectory data for a setpoint trajectory along which the motor vehicle is to travel inside the parking lot.

17. The parking lot as recited in claim 10, wherein the data for carrying out the automatic parking operation include map data of a digital map.

* * * * *